(12) United States Patent
Bronstein et al.

(10) Patent No.: US 9,824,461 B2
(45) Date of Patent: Nov. 21, 2017

(54) PROJECTOR DISTORTION COMPENSATION IN STRUCTURED LIGHT DEPTH RECONSTRUCTION

(71) Applicant: Intel Corporation, Santa Clara, CA (US)

(72) Inventors: Alex Bronstein, Haifa (IL); Aviad Zabatani, Even Yehuda (IL); Michael Bronstein, Lugano (CH); Ron Kimmel, Haifa (IL); Erez Sperling, D.N. Menashe (IL); Vitaly Surazhsky, Yokneam Illit (IL)

(73) Assignee: INTEL CORPORATION, Santa Clara, CA (US)

( * ) Notice: Subject to any disclaimer, the term of this patent is extended or adjusted under 35 U.S.C. 154(b) by 231 days.

(21) Appl. No.: 14/865,207

(22) Filed: Sep. 25, 2015

(65) Prior Publication Data

US 2017/0089690 A1    Mar. 30, 2017

(51) Int. Cl.
*G06T 7/60* (2017.01)
*H04N 7/18* (2006.01)
*G06T 7/00* (2017.01)

(52) U.S. Cl.
CPC ............... *G06T 7/60* (2013.01); *G06T 7/004* (2013.01); *G06T 7/0051* (2013.01); *H04N 7/18* (2013.01)

(58) Field of Classification Search
CPC ........... H04N 13/0246; H04N 13/0253; H04N 13/025; H04N 2013/0081
See application file for complete search history.

(56) References Cited

U.S. PATENT DOCUMENTS

2015/0002628 A1*   1/2015 Reif ..................... G06T 7/0044
                                                                348/46

\* cited by examiner

*Primary Examiner* — Nam Pham
(74) *Attorney, Agent, or Firm* — Blakely, Sokoloff, Taylor & Zafman LLP

(57) ABSTRACT

A method and apparatus for projector distortion compensation in structured light depth reconstruction are described. In one embodiment, the apparatus comprises a projector configured to project a sequence of light patterns on an object; a first camera configured to capture a sequence of images of the object illuminated with the projected light patterns; a processing unit to receive the sequence of images and reconstruct depth using triangulation in response to camera and projector location coordinates; and a projector distortion compensation unit operable to generate a new projector location coordinate in response to an observed distorted projector location coordinate, the projector distortion compensation unit to provide the new projector location coordinate to the processing unit for use in generating depth values via triangulation.

20 Claims, 8 Drawing Sheets

```
% Range
s1 = (2^PrecisionBits) / Rmax      % Range scaling
s2 = 2^CodeBits                    % Projector coordinate scal:
alpha = 2/Width/Kc(1,1)            % Camera coordinates scaling
beta  = -(Kc(1,3)+1)/Kc(1,1)
gamma = 2/Height/Kc(2,2)
delta = -(Kc(2,3)+1)/Kc(2,2)

a = alpha/gamma
b = beta/gamma
c = delta/gamma d1 = distc(1)*gamma^2
d2 = distc(2)*gamma^4 p1 = Pp(2,4)*s1
p2 = -s1*s2*(Pp(1,4)+Pp(2,4))
p3 = -Pp(2,1)
p4 = -Pp(2,2)
p5 = -Pp(2,3)/gamma
p6 = s2*(Pp(1,1)+Pp(2,1))
p7 = s2*(Pp(1,2)+Pp(2,2))
p8 = s2*(Pp(1,3)+Pp(2,3))/gamma
q  = 1/gamma^2

% Texture
suv = 2^TexturePrecisionBits h0  = (Pt(1,2)+Pt(3,2)) / (Pt(1,1)+Pt(3,1))
h1  = (Pt(1,3)+Pt(3,3)) / (Pt(1,1)+Pt(3,1)) / gamma
h2  = (Pt(2,1)+Pt(3,1)) / (Pt(1,1)+Pt(3,1))
h3  = (Pt(2,2)+Pt(3,2)) / (Pt(1,1)+Pt(3,1))
h4  = (Pt(2,3)+Pt(3,3)) / (Pt(1,1)+Pt(3,1)) / gamma
h5  = 2*Pt(3,1) / (Pt(1,1)+Pt(3,1)) / suv
h6  = 2*Pt(3,2) / (Pt(1,1)+Pt(3,1)) / suv
h7  = 2*Pt(3,3) / (Pt(1,1)+Pt(3,1)) / suv / gamma
h8  = (Pt(1,4)+Pt(3,4)) / (Pt(1,1)+Pt(3,1)) * s1
h9  = (Pt(2,4)+Pt(3,4)) / (Pt(1,1)+Pt(3,1)) * s1
h10 = 2*Pt(3,4) / (Pt(1,1)+Pt(3,1)) * s1 / suv
```

FIG. 5

```
% Inverse camera model
x = a*xcam + b
y = ycam + c
r2 = x^2 + y^2
r2c = 1 + d1*r2 + d2*r2^2 + d5*r2^3
xc = x*r2c + 2*d3*x*y + d4*(r2 + 2*x^2)
yc = y*r2c + 2*d4*x*y + d3*(r2 + 2*y^2)
nrm = sqrt( xc^2 + yc^2 + q )

% R coefficients
TriangCoef1 = p1*nrm
TriangCoef2 = p2*nrm
TriangCoef3 = p3*xc + p4*yc + p5
TriangCoef4 = p6*xc + p7*yc + p8

% UV coefficients
TextureCoef1 = xc + h0*yc + h1
TextureCoef2 = h2*xc + h3*yc + h4
TextureCoef3 = h5*xc + h6*yc + h7
TextureCoef4 = h8*nrm
TextureCoef5 = h9*nrm
TextureCoef6 = h10*nrm % Range reconstruction
r = (TriangCoef1 * xp + TriangCoef2) /
    (TriangCoef3 * xp + TriangCoef4)

% Texture map reconstruction
den = TextureCoef3 * r + TextureCoef6
u   = (TextureCoef1 * r + TextureCoef4) / den
v   = (TextureCoef2 * r + TextureCoef5) / den
```

FIG. 6

PROJECTOR DISTORTION COMPENSATION IN STRUCTURED LIGHT DEPTH RECONSTRUCTION

FIELD OF THE INVENTION

Embodiments of the present invention relate to the field of camera systems that perform three-dimensional (3-D) measurements by use of active triangulation capturing one or more images with the assistance of one or more patterns projected by a projector; more particularly, embodiments of the present invention relate to performing projector distortion compensation of such camera systems.

BACKGROUND

Stereo depth cameras are well-known and are often used to measure a distance from an object. One such measurement device includes a projector and a camera. In such a device, the projector projects a known pattern image on an object (e.g., a scene), and an image of the object upon which the image is projected is captured by the camera. From the captured images, depth information may be determined. One technique for determining depth in such devices is through the use of triangulation. Thus, images of objects are captured and measurements are taken to determine depth information.

In order to perform triangulation accurately in the devices, the projected pattern from the projector must be planar. However, at times, there will be a distortion in the optical system of the projector which results in a distortion in the projected pattern. As a result, the projected pattern will cease being planar. For example, in such cases, the typical projector distortion will make the projected planes banana-shaped. Unfortunately, with the projected planes from the projector being distorted, the standard triangulation process used to determine depth with result in erroneous depth information being generated;

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 illustrates an example of coefficient precomputation parameters.

FIG. 6 illustrates an example of range and texture reconstruction and coefficient precomputation.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
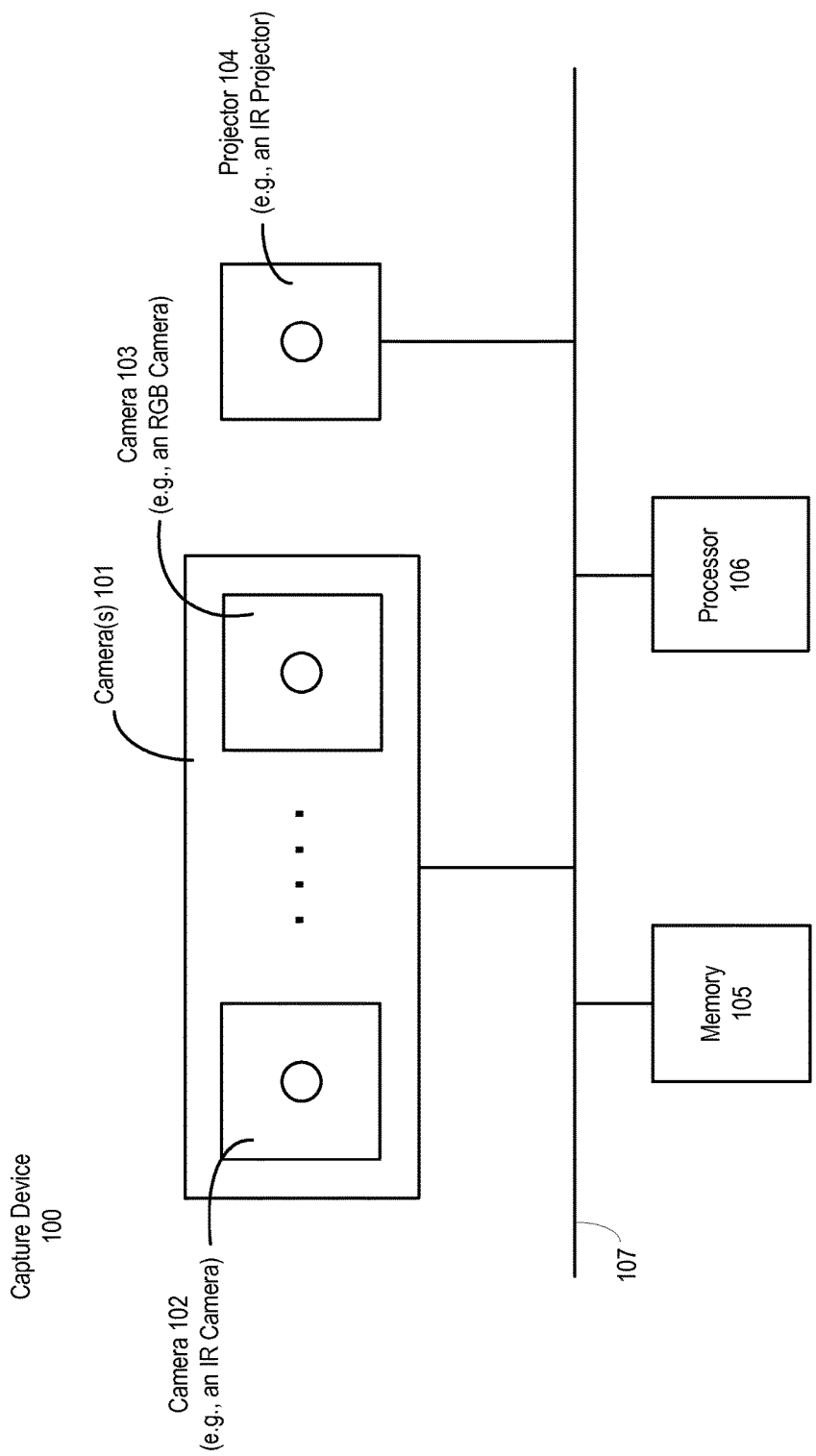
FIG. 1 illustrates one embodiment of an active coded light triangulation system.

FIG. 1 illustrates one embodiment of an active coded light triangulation system. The system includes coded light range cameras operating by projecting a sequence of one-dimensional binary ("black" and "white") patterns onto a scene, such that the produced binary code encodes the angle of the projection plane. Depth is then reconstructed by triangulation consisting of computing the intersection of an imaginary ray emanating from the camera with the plane emanating from the projector.

Referring to FIG. 1, capture device 100 may include a 3D scanner, a 3D camera or any other device configured for a 3D object acquisition. In some embodiments, as illustrated, capture device 100 includes an image capturing device 102 (e.g., a digital camera) and a projector unit 104, such as a laser projector or laser scanner, having a number of components. In some embodiments, digital camera 102 may comprise an infrared (IR) camera, and the projector unit 104 may comprise an IR projector.

Projector unit 104 is configured to project a light pattern as described above and may comprise a one-dimensional code projector. In one embodiment, the light patterns comprise one-dimensional coded light patterns, e.g., the patterns that may be described by one-dimensional or linear codes. The light patterns formed by the laser planes on a surface of the object may be received by image capturing device 102 and sensed (e.g., read) by a sensor of image capturing device 102. Based on the readings of the multiple scans of the light patterns accumulated during a sensing cycle of the sensor, capture device 100 may be configured to reconstruct the shape of the object.

In some embodiments, capture device 100 may further include another image capturing device, such as digital camera 103. In some embodiments, digital camera 103 may have a resolution that is different than that of digital camera 103. For example, digital camera 102 may be a multichromatic camera, such as red, green, and blue (RGB) camera configured to capture texture images of an object.

Capture device 100 may further include a processor 106 that may be in operative communication with the image camera component 101 over a bus or interconnect 107. Processor 106 may include a standardized processor, a specialized processor, a microprocessor, or the like that may execute instructions that may include instructions for generating depth information, generating a depth image, determining whether a suitable target may be included in the depth image, or performing other operations described herein.

Processor 106 may be configured to reconstruct the object based on the images captured by digital camera 102, for example, using geometry techniques or other techniques used for 3D image reconstruction. Processor 106 may be further configured to dynamically calibrate capture device 100 to correct distortions in the reconstructed image of the object that may be caused, for example, by various external factors (e.g., temperature).

Capture device 100 may further include a memory 105 that may store the instructions that may be executed by processor 106, images or frames of images captured by the cameras, user profiles or any other suitable information, images, or the like. According to one example, memory 105 may include random access memory (RAM), read only memory (ROM), cache, Flash memory, a hard disk, or any other suitable storage component. As shown in FIG. 1, memory component 105 may be a separate component in communication with the cameras 101 and processor 106. Alternatively, memory 105 may be integrated into processor 106 and/or the image capture cameras 101. In one embodiment, some or all of the components 102-106 are located in a single housing.

Processor 105, memory 104, other components (not shown), image capturing device 102, and projector unit 104 may be coupled with one or more interfaces (not shown) configured to facilitate information exchange among the above-mentioned components. Communications interface(s) (not shown) may provide an interface for device 100 to communicate over one or more wired or wireless network(s) and/or with any other suitable device. In various embodiments, capture device 100 may be included to or associated with, but is not limited to, a server, a workstation, a desktop computing device, or a mobile computing device (e.g., a laptop computing device, a handheld computing device, a handset, a tablet, a smartphone, a netbook, ultrabook, etc.).

In one embodiment, capture device 100 is integrated into a computer system (e.g., laptop, personal computer (PC), etc.). However, capture device 100 can be alternatively configured as a standalone device that is couplable to such a computer system using conventional technologies including both wired and wireless connections.

In various embodiments, capture device 100 may have more or less components, and/or different architectures. For example, in some embodiments, capture device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, capture device 100 may have more or less components, and/or different architectures. In various embodiments, techniques and configurations described herein may be used in a variety of systems that benefit from the principles described herein.

Capture device 100 may be used for a variety of purposes, including, but not limited to, being part of a target recognition, analysis, and tracking system to recognize human and non-human targets in a capture area of the physical space without the use of special sensing devices attached to the subjects, uniquely identify them, and track them in three-dimensional space. Capture device 100 may be configured to capture video with depth information including a depth image that may include depth values via any suitable technique including, for example, triangulation, time-of-flight, structured light, stereo image, or the like.

Capture device 100 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, capture device 100 includes an IR light projector 404, an IR camera 102, and a visible light RGB camera 103 that are configured in an array.

Various techniques may be utilized to capture depth video frames. For example, capture device 100 may use structured light to capture depth information. In such an analysis, patterned light (i.e., light displayed as a known pattern such as a grid pattern or a stripe pattern) may be projected onto the capture area via, for example, IR light projector 104. Upon striking the surface of one or more targets or objects in the capture area, the pattern may become deformed in response. Such a deformation of the pattern may be captured by, for example, the IR camera 102 and/or the RGB camera 103 and may then be analyzed to determine a physical distance from capture device 100 to a particular location on the targets or objects.

Capture device 100 may utilize two or more physically separated cameras that may view a capture area from different angles, to obtain visual stereo data that may be resolved to generate depth information. Other types of depth image arrangements using single or multiple cameras can also be used to create a depth image.

Capture device 100 may provide the depth information and images captured by, for example, IR camera 102 and/or the RGB camera 103, including a skeletal model and/or facial tracking model that may be generated by capture device 100, where the skeletal and/or facial tracking models, depth information, and captured images are used to, for example, create a virtual screen, adapt the user interface, and control an application.

In summary, capture device 100 may comprise a projector unit 104, a digital camera (e.g., IR camera) 102, another digital camera (e.g., multi-chromatic camera) 103, and a processor (controller) configured to operate capture device 100 according to the embodiments described herein. However, the above assembly configuration is described for illustration purposes only, and is should not be limiting to the present disclosure. Various configurations of an assembly for a 3D object acquisition may be used to implement the embodiments described herein. For example, an assembly for a 3D object acquisition configured to enable the reconstructed object distortion corrections may include three digital cameras, two of which may be used to reconstruct a 3D image of an object, and the third camera (e.g. with a resolution that is different than those of the two cameras) may be used to capture images of the object in order to identify image distortions in the reconstructed object and to compensate for identified distortions.

Projector Distortion Compensation

Techniques described herein are directed to the problem of projector distortion of a stereo depth camera. A distortion in the optical system of the projector results in a distortion in the projected pattern, which will cease being planar (a typical distortion will make the projected planes banana-shaped). In one embodiment, when the image data from the stereo depth camera is processed to produce depth information (e.g., depth values), a triangulation process issued.

Through the triangulation process, the distortion associated with the optical system of the projector (i.e., projector distortion) results in an error in the determined depth.

More specifically, as discussed above, a coded light camera comprising an IR projector 104 projects one-dimensional code patterns onto the scene, and an IR camera 102 captures the patterns. Decoding of the captured patterns at every pixel location $x_c$ in the camera produces a code encoding the location $x_p$ of the projected plane. In triangulation, the plane is intersected with the ray emanating from the camera focal point through $x_c$, yielding the distance to the object $z(x_c)$.

In one embodiment, a processing unit receives a sequence of images and reconstructs depth using triangulation in response to camera and projector location coordinates. A projector distortion compensation unit generates a new projector location coordinate in response to an observed distorted projector location coordinate and provides the new projector location coordinate to the processing unit for use in generating depth values via triangulation. In one embodiment, the processing unit is operable to generate a depth value based on the new projector location coordinate a camera location coordinate. In one embodiment, the projector distortion compensation unit generates the new projector location coordinate using successive approximations created by a sequence of linearizations of the distorted projected surface. The result is a depth image with considerably diminished distortions.

Figure 2:
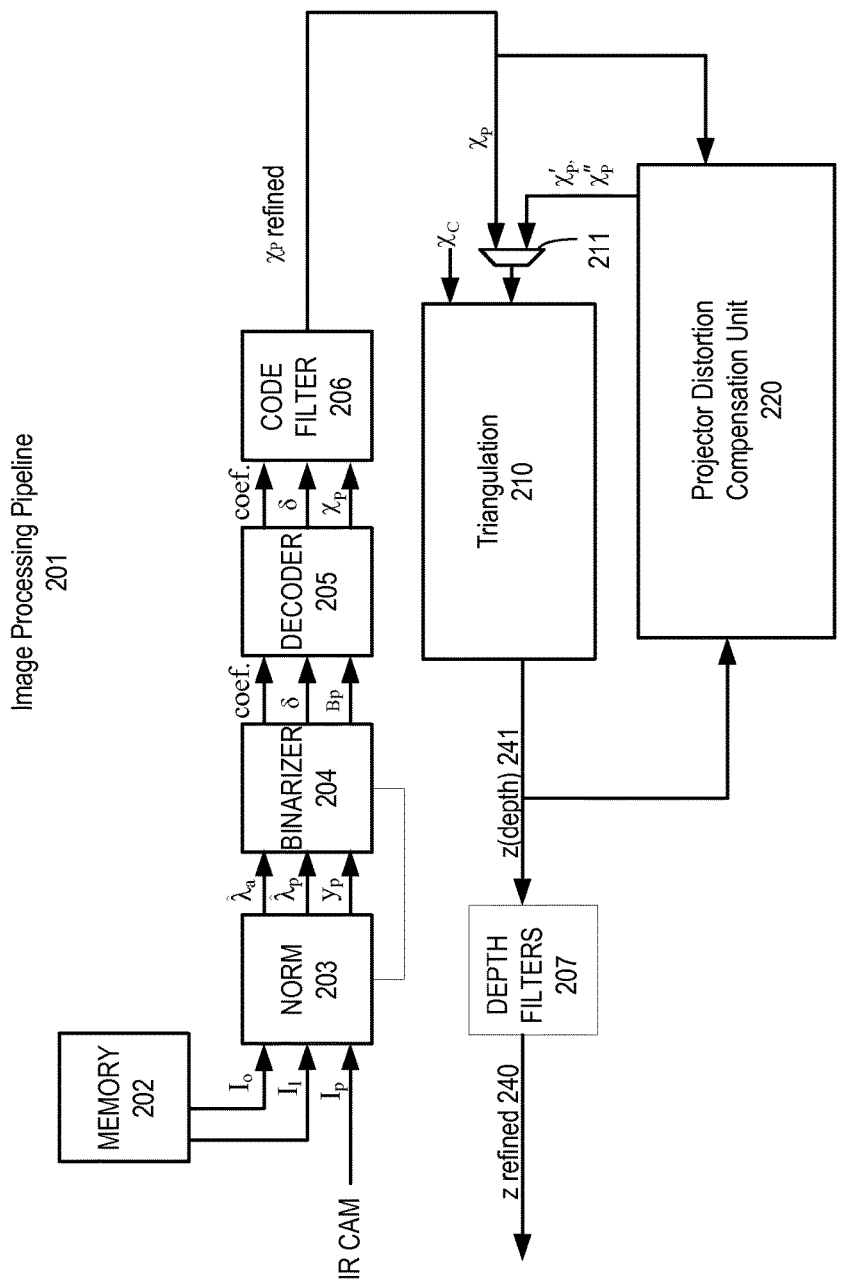
FIG. 2 is a block diagram depicting one embodiment of a processing pipeline with projector distortion compensation for a stereo depth camera.

FIG. 2 is a block diagram depicting one embodiment of an image processing pipeline for a stereo depth camera. The stereo depth camera comprise a projector configured to project a sequence of light patterns on an object and a first camera configured to capture a sequence of images of the object illuminated with the projected light patterns.

Referring to FIG. 2, a flow of processing the input from the IR camera to determine depth values is described. In the process, depth values are determined using a triangulation reconstruction process. In one embodiment, the reconstruction process comprises several operations of successive linearization of the distorted projector surface, and the computation of array-plane intersection from which the point in the world coordinates is triangulated. The triangulation-based reconstruction process is configured to take into account the projector distortion.

Image processing pipeline 301 receives a sequence of images and determines depth information in response to parameters of the projector (e.g., projector 104) and camera (e.g., camera 102). Image processing pipeline 301 is performed by processing logic that may comprise hardware (circuitry, dedicated logic, etc.), software (such as is run on a general purpose computer system or a dedicated machine), firmware, or a combination of these three. Note that in one embodiment, image processing pipeline 201 of FIG. 2 is part of the capture device (e.g., the capture device of FIG. 1). In another embodiment, the image processing pipeline of FIG. 2 is not part of the capture device and performs triangulation in a separate device.

Image processing pipeline 201 includes a memory 202 that stores sequences of patterns. The IR camera captures images and provides captured sequences of patterns $I_p$ to normalization unit 203. The sequences of patterns are normalized via normalization unit 203, which provides the normalized pattern sequences to binarization unit 204. Binarization unit 204 generates binarization codes based on the normalized sequences of patterns and provides the binarization codes to decoder 205. Decoder 205 decodes each of the binarization codes to create a decoded value $x_p$ of a pixel location of the pixel on a projector plane. Code filter 206 performs filtering to remove and/or correct those values that are not possible. The output of code filter 206 is the value of $x_p$ corresponding to a pixel, which is received as an input at the triangulation-based reconstructions module. The image processing performed by normalization unit 203, binarization unit 204, decoder 205 and code filter 206 is well-known in the art.

Image processing pipeline 201 includes a triangulation processing unit 210. Triangulation processing unit 210 receives $x_p$ and $x_c$, which are well-known in the triangulation process and calibration parameters and, in response thereto, generates depth values, z, by use of triangulation.

The triangulation-based reconstruction process is configured to take into account of projector distortion. This is through the use of projector distortion compensation unit 220. That is, in one embodiment, triangulation unit 210 and projector distortion compensation unit 220 operate together to perform the triangulation-based reconstruction process is configured to take into account of projector distortion.

In one embodiment, the process to perform the reconstruction based on the distortion model of the projector is performed according to the algorithm is summarized in Algorithm 1. In the algorithm, a polynomial model for the forward projector distortion is used. In one embodiment, since such a model is difficult to invert, the same polynomial model (with different coefficients) is used for the inverse distortion transformation.

Following is an example of the algorithm to perform the reconstruction based on the distortion model of the projector:

---

Algorithm 1: Distortion-corrected reconstruction input: undistorted camera location $x_c'$; observed distorted projector location $x_p$
output: reconstructed point X in world coordinates
Compute initial undistorted projector coordinate $x_p' = D_p^{-i}(x_p, 0)$
Reconstruct $X = R(x_c', x_p')$
Reproject $(x_p'', y_p'') = P_p X$; discard $y_p''$.
Estimate new distorted projector location $x_p'' = D_p(x_p, \hat{y}_p)$
Reconstruct $X = R(x_c', x_p'')$

--- where $D_p$ is the distortion model of the projector, $D_p^{-1}$ is the inverse distortion model of the projector, $P_p$ is the projection matrix of the projector, and R is the inverse projection operator (triangulation operator).

In one embodiment, the reconstruction operations are performed by the triangulation unit. Also, with respect to the first reconstruction operation in Algorithm 1, X is immediately projected by $P_p$, so generation of the next reconstructed value will not be delayed and is ready at the correct cycle for a depth value output. In one embodiment, the last three operations of re-projecting, estimating, and reconstructing may be iteratively performed for one or more iterations.

More specifically, for every pixel, in one embodiment, the process performs the following operations:

1. Determining a distortion-corrected 1D code based on a distortion model of the projector assuming the other (latent) projector coordinate to be at the center of projection.

2. Determining a 3D point location by applying the triangulation-based reconstruction to the said distortion-corrected 1D projector code.

3. Re-projecting the 3D point location on the projector plane using a predefined projection transformation of the projector.

4. Determining a distortion-corrected 1D code based on a distortion model of the projector using the latent projector coordinate from (3), while keeping the other coordinate equal to its measured value.

5. Determining a 3D point location by applying the triangulation-based reconstruction to the distortion-corrected 1D projector code from (4).

6. Optional—perform at least one iteration of the operations (3)-(5) using the reconstructed pixel coordinate of (5). In one embodiment, two iterations are performed.

Figure 3:
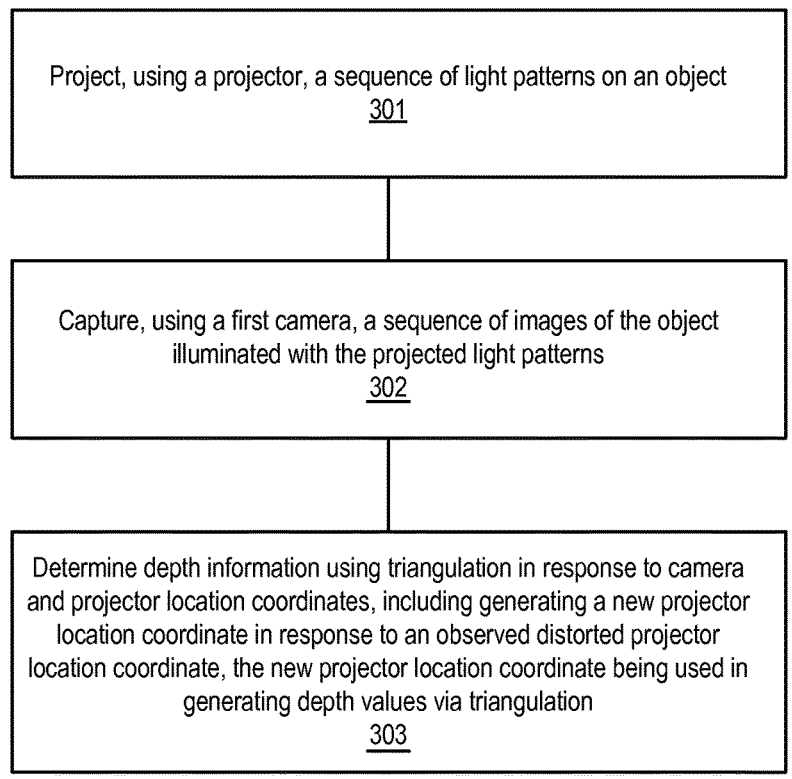
FIG. 3 is a flow diagram of one embodiment of a process for performing projector distortion correction in a system that generates depth values via triangulation.

FIG. 3 is a flow diagram of one embodiment of a process for performing projector distortion correction in a system that generates depth values via triangulation. The process is performed by processing logic that may comprise hardware (circuitry, dedicated logic, etc.), software (such as is run on a general purpose computer system or a dedicated machine), firmware, or a combination of these three.

The process begins by processing logic projecting, using a projector, a sequence of light patterns on an object (processing block 301).

Next, processing logic captures, using a first camera, a sequence of images of the object illuminated with the projected light patterns (processing block 302).

Then, using results from the capture, processing logic determines depth information using triangulation in response to camera and projector location coordinates, including generating a new projector location coordinate in response to an observed distorted projector location coordinate, the new projector location coordinate being used in generating depth values via triangulation (processing block 303). In one embodiment, generating the new projector location coordinate using successive approximation creates by a pair of linearizations. In one embodiment, generating a depth value is based on the new projector location coordinate and an undistorted camera location coordinate.

Figure 4:
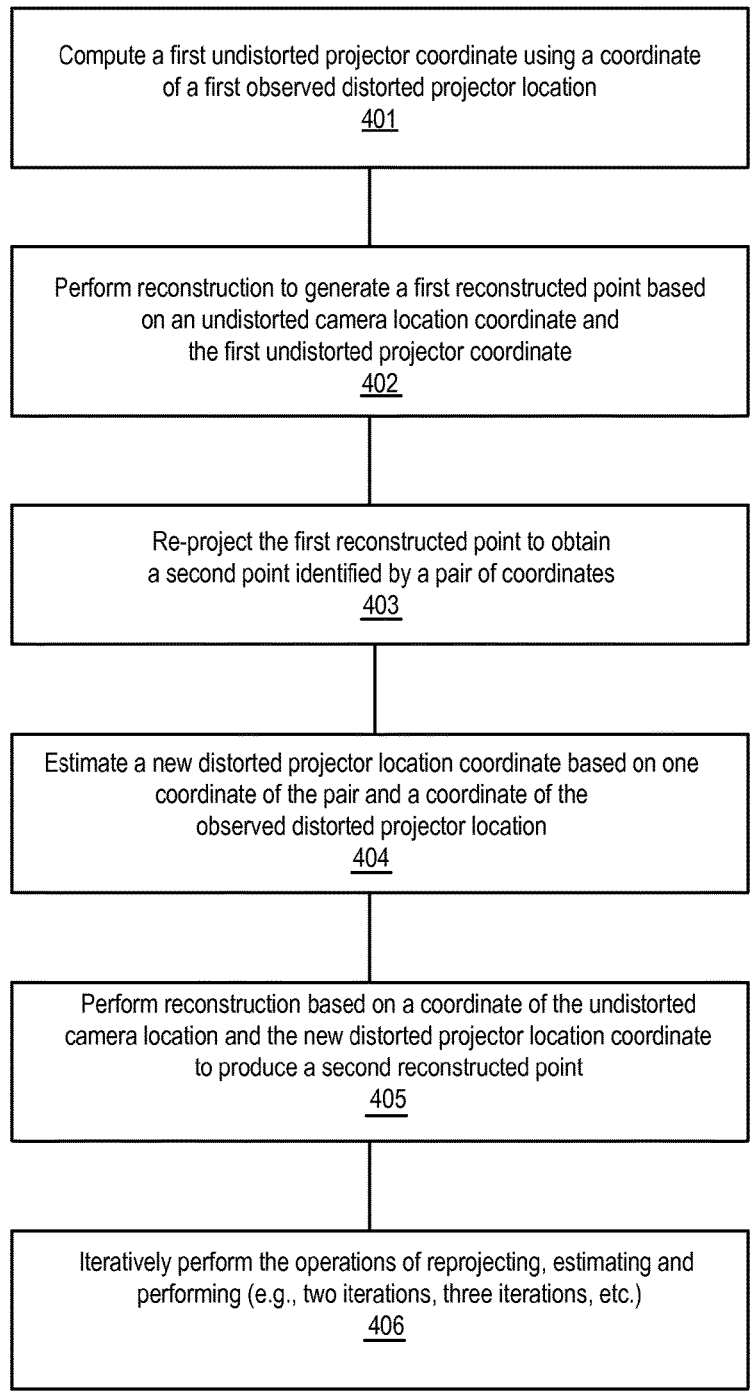
FIG. 4 is a flow diagram of one embodiment of a process for determining depth information using triangulation.

FIG. 4 is a flow diagram of one embodiment of a process for determining depth information using triangulation. The process is performed by processing logic that may comprise hardware (circuitry, dedicated logic, etc.), software (such as is run on a general purpose computer system or a dedicated machine), firmware, or a combination of these three.

The process begins by processing logic computing a first undistorted projector coordinate using a coordinate of a first observed distorted projector location (processing block 401). In one embodiment, computing a first undistorted projector coordinate using a coordinate of a first observed distorted projector location comprises determining a distortion-corrected 1D code based on a distortion model of the projector assuming the other (latent) projector coordinate to be at the center of projection. In one embodiment, computing the first undistorted projector coordinate is performed by applying a distortion model to the first observed distorted coordinate. In one embodiment, applying the distortion model to the first observed distorted coordinate comprises applying the distortion model to the first observed distorted coordinate and a second coordinate, the second coordinate being set to a center of a vertical axis of projection.

Next, processing logic performs reconstruction to generate a first reconstructed point based on an undistorted camera location coordinate and the first undistorted projector coordinate (processing block 402). In one embodiment, performing reconstruction to generate a first reconstructed point based on an undistorted camera location coordinate and the first undistorted projector coordinate comprises determining a 3D point location by applying the triangulation-based reconstruction to the distortion-corrected 1D projector code Using the results of reconstruction, processing logic re-projects the first reconstructed point to obtain a second point identified by a pair of coordinates (processing block 403). In one embodiment, re-projecting the first reconstructed point to obtain a second point identified by a pair of coordinates comprises re-projecting the 3D point location on the projector plane using a predefined projection matrix of the projector.

After re-projecting, processing logic estimates a new distorted projector location coordinate based on one coordinate of the pair and a coordinate of the observed distorted projector location (processing block 404). In one embodiment, estimating a new distorted projector location coordinate based on one coordinate of the pair and a coordinate of the observed distorted projector location comprises determining a distortion-corrected 1D code based on a distortion model of the projector using the latent projector coordinate from the results of re-projecting.

Thereafter, processing logic performs reconstruction based on a coordinate of the undistorted camera location and the new distorted projector location coordinate to produce a second reconstructed point (processing block 405). Note that in one embodiment, the reconstruction points are usually represented as the length of the ray emanating from the camera. This information refers to a "range" and can be converted to "depth" by taking the projection of the ray on the z axis. The other two X and Y coordinates can be calculated by projecting on the x and y axes. In one embodiment, performing reconstruction based on a coordinate of the undistorted camera location and the new distorted projector location coordinate to produce a second reconstructed point comprises determining a 3D point location by applying the triangulation-based reconstruction to the distortion-corrected 1D projector code from estimating the new distorted projector location coordinate.

In one embodiment, using the second reconstructed pixel coordinate, processing logic iteratively performs the operations of reprojecting, estimating and performing (e.g., two iterations, three iterations, etc.) (processing block 406). The iterations are performed until the estimated depth values cease from changing much from iteration to iteration. The iterations are optional.

Conceptual Description of the Projector Distortion—Compensated Reconstruction

The following is an example of the calculations performed by the triangulation-based reconstruction process based on the projector distortion according to one embodiment.

A mapping between a point X in world coordinates and a distorting optical system is modeled as $$x = D(K(U\ t)X) = D(PX) \quad (1)$$

where X is a 3×1 vector representing the world point location in homogenous coordinates, K is the 3×3 upper-triangular intrinsic projection matrix, U and t are, respectively, the extrinsic rotation matrix and translation vector, x is the 3×1 vector of homogenous coordinates in the projection plane, and D is a forward distortion model.

The following denotes $$x_c = D_c(K_c(I\ 0)X)$$

$$x_p = D_p(P_pX) \quad (2)$$

referring explicitly to the camera and projector systems, respectively, where the camera system of coordinates is selected to coincide with the world system.

Depth is reconstructed by observing at a camera pixel location $x_c$ the first coordinate $x_p$ of the two-dimensional projector location $x_p=(x_p,y_p)^T$. Note that both $x_c$ and $x_p$ are after distortion, and $y_p$ is unobserved. Reconstruction is performed by the inverse projection operator R (also known as "triangulation"), $$X=R(x'_c,x'_p) \quad (3)$$

where $x'_c=D_c^{-1}(x_c)$ and $x'_p=D_p^{-1}(x_p)$ are the undistorted camera and projector coordinates, respectively. Since the location of each pixel $x_c$ is fixed, the corresponding $x'_c$ is precomputed. On the other hand, the projector coordinate cannot be undistorted as the inverse distortion $D_p^{-1}$ requires the knowledge of the unobserved second coordinate $y_p$. More details regarding one embodiment of the triangulation-based reconstruction process are given below.

Assuming the true $x_p$ is known, for a given $x'_c$, the reconstructed world coordinate is given by $X=R\ (x'_c,\ D_p^{-1}(x_p))$, reprojecting the result back onto the projector plane yields $x_p=D_p(P_pX)$. In other words, the operator $$x_p=D_p(P_pR(x'_c,D_p^{-1}(x_p))) \quad (4)$$

is an identity map. Fixing the observed $x_p$, the identity restricted to one degree of freedom is $$y_p=D_p(P_pR(x'_c,D_p^{-1}(x_p,y_p)))=S(y_p) \quad (5)$$

where $x'_p=D_p^{-1}(x_p)$ is the first (observable) coordinate of the undistorted projector coordinate, and $y_p=D_p\ (x'_p)$ is the second (unobservable) distorted coordinate of the projector.

Since the operator S is continuous, it has a fixed point, to which the result of application of S multiple times shall converge regardless of the initial value of $y_p$. $y_p$ can be initialized at zero, resulting in the following sequence of fixed point iterations $$y_p=S \circ \ldots \circ S(0). \quad (6)$$

In many practical situations when the distortion is mild, a single iteration suffices, giving $$y_p \approx S(0). \quad (7)$$

Dealing with more severe distortion, it may still be sufficient to perform just two of such iterations, resulting in $$y_p \approx S(S(0)). \quad (8)$$

One Embodiment of a Triangulation Process with an Exemplary Forward Model

Pattern Camera

Given a point x in world coordinates, it is projected onto the camera image plane by the following pin-hole model:

$$x'_c=K_c(I\ 0)x \quad (1)$$

where $x_c$ is a 4×1 vector representing the world point location in homogenous coordinates, $K_c$ is the 3×3 upper-triangular intrinsic camera matrix, $$K_c = \begin{pmatrix} f_x & & c_x \\ & f_y & c_y \\ & & 1 \end{pmatrix}, \quad (2)$$

and $x_c$ is the 3×1 vector of uncorrected homogenous camera coordinates. The camera system of coordinates is assumed to coincide with the world coordinate system, therefore trivial rotation and translation (extrinsic) matrices are imposed.

Pattern Camera Lens Distortion

To account for the lens distortion, a parametric distortion model is applied. The corrected camera coordinates vector $x_c$ is related to its uncorrected counterpart $x'_c$ through the following inverse model given by $$x'_c=K_cD_\alpha(K_c^{-1}x_c) \quad (3)$$

where D is a plane-to-plane map given by $$x'=(1+\alpha_1p^2+\alpha_2p^4+\alpha_3p^6)x+2\alpha_4 ry+\alpha_5(p^2+2x^2)$$

$$y'=(1+\alpha_1p^2+\alpha_2p^4+\alpha_3p^6)y+2\alpha_5 ry+\alpha_4(p^2+2y^2) \quad (4)$$

with $p^2=x'^2+y'^2$. The parameters $\alpha_1, \alpha_2, \alpha_3$ govern the radial distortion component, while $\alpha_4$ and $\alpha_5$ account for the tangential one. The vector $\alpha=(\alpha_1,\ \alpha_5)^T$ is referred to herein as to the camera inverse distortion parameters. Note that the difference between this inverse model versus the standard forward model used in other systems. The benefits of the teachings described herein will be evident when the reconstruction process is disclosed.

Projector

The projector is modeled as a one-dimensional pin-hole system $$x_p=K_p(R_p\ t_p)x=P_px, \quad (5)$$

where $x_p$ is the 2×1 vector of homogenous coordinate on the projector line, $K_p$ is the 2×3 intrinsic matrix, and $R_p$ and $t_p$ are the extrinsic rotation and translation transformation Parameters, respectively, relating between the camera and the projector coordinate systems. In one embodiment, the intrinsic and the extrinsic projector parameters are combined into a single 2×4 projection matrix $P_p$.

Texture Camera

The texture camera is modeled as a two-dimensional pin-hole system $$x'_t=K_t(R_t\ t_t)x=P_tx, \quad (6)$$

where $x_t$ is the 3×1 uncorrected vector of homogenous coordinate on the camera plane, $K_t$ is the 3×3 intrinsic matrix, and $R_t$ and $t_t$ are the extrinsic rotation and translation transformation parameters, respectively, relating between the pattern and the texture cameras coordinate systems. In one embodiment, the intrinsic and the extrinsic texture camera parameters are combined into a single 3×4 projection matrix $P_t$.

Texture Camera Lens Distortion

To account for the lens distortion, a forward parametric distortion model is applied:

$$x_t=K_tD_\beta(K_t^{-1}x'_t) \quad (7)$$

where D is a plane-to-plane map given by $$x=(1+\beta_1p^2+\beta_2p^4+\beta_3p^6)x'+2\beta_4 x'y'+\beta_5(p^2+2x^2)$$

$$y=(1+\beta_1p^2+\beta_2p^4+\beta_3p^6)y'+2\beta_5 x'y'+\beta_4(p^2+2y^2) \quad (8)$$

with $p^2=x'^2+y'^2$. The parameters $\beta_1, \beta_2, \beta_3$ govern the radial distortion component, while $\beta_4$ and $\beta_5$ account for the tangential one. For purposes herein, the vector $\beta=(\beta_1, \ldots \beta_5)^T$ is referred to as the texture camera forward distortion parameters. The forward model is applied by transforming directly the texture image using $D_\beta$. In one embodiment, the process is performed on the host system due to the requirement of random access to the frame buffer.

Depth Reconstruction

The purpose of depth reconstruction is to establish for each pixel in the pattern camera image its distance from the camera center of coordinates. The term "depth" shall be understood as either the said distance r or its projection z onto the optical axis of the pattern camera.

Given a pixel at position $x_c=(x_c,\ y_c,1)^T$ in the camera image plane and the corresponding code value $x_p=(x_p,1)^T$ of the projector, by applying the inverse distortion model (7), a corrected pixel location $x'_c=(x'_c, y'_c, 1)^T$ is obtained. The pinhole camera projection (1) introduces ambiguity by projecting all points along the ray $x=rd$, $r>0$, to $x'_c$.

In order to characterize the ray $d=(d_x; d_y; d_z)^T$, the following is written $$\beta x'_c = K_c d, \qquad (9)$$

where $\beta \neq 0$ is an arbitrary scaling factor. This yields $$d_z x'_c = (K_c)_1^T d = f_x d_x + c_x d_z$$

$$d_z y'_c = (K_c)_2^T d = f_y d_y + c_y d_z \qquad (10)$$

where $(K_c)_i^T$ denotes the i-th row vector of $K_c$. Solving for $d_x$, $d_y$ and $d_z$ gives $$d = \begin{pmatrix} f_x^{-1}(x'_c - c_x) \\ f_y^{-1}(y'_c - c_y) \\ 1 \end{pmatrix} \qquad (11)$$

Since the pixel grid is fixed at reconstruction, in one embodiment, the described process is precomputed for every pixel in the image.

The projector forward model (6) introduces ambiguity by projecting an entire plane onto $x_p$; however, the intersection of the latter plane with the ray $x=rd$ yields a unique point in space. Substituting the unit direction $d=d/\|d\|$ into the projector model gives $$\beta x_p = P_p \begin{pmatrix} rd \\ 1 \end{pmatrix}, \qquad (12)$$

which can be rewritten as $$\beta x_p = \frac{rp_1^T d + 1q_1}{rp_2^T d + 1q_2} = \frac{rp_1^T d + 1q_1 \|d\|}{rp_2^T d + 1q_2 \|d\|} \qquad (13)$$

where the projector matrix is decomposed into $$P_p = \begin{pmatrix} p_1^T q_1 \\ p_2^T q_2 \end{pmatrix} \qquad (14)$$

Solving for r, one has the depth $$r = \frac{T_1 x_p + T_2}{T_3 x_p + T_4} \qquad (15)$$

where $$T_1 = q_2 \|d\|$$

$$T_2 = -q_1 \|d\|$$

$$T_3 = p_2^T d$$

$$T_4 = -p_1^T d \qquad (16)$$

are scalar coefficients depending only on the pixel location $x_c$ (and therefore can be precomputed). For purposes herein, $T_1, \ldots T_4$ are referred to as range triangulation coefficients. Note that using the unnormalized ray saves one division operation.

The depth r can be further projected onto $d_z$ yielding $$z = \frac{T_1 x_p + T_2}{T_3 x_p + T_4} \frac{d_z}{\|d\|} \qquad (17)$$

$$= \frac{T'_1 x_p + T'_2}{T_3 x_p + T_4}$$

where $$T'_1 = q_2 d_z$$

$$T'_2 = -q_1 d_z \qquad (18)$$

are the modified coefficients.

Texture Map Reconstruction

Once the range has been established, the texture map coordinates are reconstructed using the forward model $$x_t = P_t\begin{pmatrix} rd \\ 1 \end{pmatrix} = P_t\begin{pmatrix} \|d\| rd \\ 1 \end{pmatrix} \qquad (19)$$

from where $$x_t = \frac{rp_1^T d + q_1 \|d\|}{rp_3^T d + q_3 \|d\|} \qquad (20)$$

$$y_t = \frac{rp_2^T d + q_2 \|d\|}{rp_3^T d + q_3 \|d\|}$$

where $(p_i^T q_i)$ is the i-th row of $P_t$. This can be rewritten as $$x_t = \frac{\sigma_1 r + \sigma_4}{\sigma_3 r + \sigma_6} \qquad (21)$$

$$y_t = \frac{\sigma_2 r + \sigma_5}{\sigma_3 r + \sigma_6},$$

where $$\sigma_1 = p_1^T d$$

$$\sigma_2 = p_2^T d$$

$$\sigma_3 = p_3^T d$$

$$\sigma_4 = q_1 \|d\|$$

$$\sigma_5 = q_2 \|d\|$$

$$\sigma_6 = q_3 \|d\| \qquad (22)$$

In case the output depth is projected onto the camera optical axis, texture coordinates are obtained from $r=z\|d\|/d_z$, $$x_t = \frac{z p_1^T d \|d\| + q_1 \|d\| d_z}{rp_3^T d + q_3 \|d\|} \qquad (23)$$

$$\frac{z p_1^T + q_1 d_z}{z p_3^T d + q_3 d_z}$$

and, similarly, $$y_t = \frac{zp_2^T + q_1 d_z}{zp_3^T d + q_3 d_z} \quad (24)$$

This can be expressed as (21) with $\sigma_4$, $\sigma_5$ replaced by $\sigma_6$ replaced by $$\sigma'_4 = q_1 d_z$$
$$\sigma'_5 = q_2 d_z$$
$$\sigma'_6 = q_3 d_z. \quad (25)$$

Coefficient Scaling and Precomputation

In the following, a compact and efficient way to compute the coefficients $T_i$ and $\sigma_i$ is disclosed. It assumes the pattern camera coordinates to be unnormalized and translated from $[-1, 1]^2$ to $[0, W-1] \times [0, H-1]$; the projector coordinate is assumed to be translated from $[-1, 1]$ to $[0; s_2-1]$ ($s_2 = 2^{15}-1$ in one embodiment); the output range or depth is mapped from the interval $[0; r_{max}]$ to $[0, 2^{16}-1]$ by the scaling factor $s_1$; and the texture map coordinates are computed translated from $[-1, 1]$ to $[0, s_{uv}]$ with $s_{uv} = 2^{12}-1$ in one embodiment.

Inverse Camera Distortion Model

Substituting the scales into the camera distortion model, the following is obtained with appropriate scaling $$x = \frac{2}{W f_x} x_c - \frac{H}{2} \frac{f_y}{f_x}(c_x + 1) \quad (26)$$

$$y = y_c - \frac{H}{2}(c_y + 1).$$

The distortion model becomes $$x' = (1 + d_1 p^2 + d_2 p^4 + d_3 p^6)x + 2d_4 xy + d_5(p^2 + 2x^2)$$

$$y' = (1 + d_1 p^2 + d_2 p^4 + d_3 p^6)y + 2d_5 xy + d_4(p^2 + 2y^2) \quad (27)$$

$p^2 = x^2 + y^2$ and $d_i$ are the distortion parameters scaled according to $$d_1 = \left(\frac{2}{H f_y}\right)^2 \alpha_1 \quad (28)$$

$$d_2 = \left(\frac{2}{H f_y}\right)^4 \alpha_2$$

$$d_3 = \alpha_3$$

$$d_4 = \left(\frac{2}{H f_y}\right)^2 \alpha_4$$

$$d_5 = \left(\frac{2}{H f_y}\right)^2 \alpha_5.$$

Ray direction. With the selected scaling, the unnormalized ray d passing through the pixel becomes $$d = \left(x', y', \frac{H f_y}{2}\right), \quad (29)$$

and its norm $$\|d\| = \sqrt{x'^2 + y'^2 + q}, \quad (30)$$

where $$q = \left(\frac{H f_y}{2}\right)^2 \quad (31)$$

Range Coefficients

In one embodiment, range coefficients assume the form $$T_1 = p_1 \|d\| \quad (32)$$
$$T_2 = p_2 \|d\|$$
$$T_3 = p_3 x' + p_4 y' + p_5$$
$$T_4 = p_6 x' + p_7 y' + p_8$$

where $$p_1 = (P_p)_{24} s_1 \quad (33)$$
$$p_2 = -s_1 s_2((P_p)_{14} + (P_p)_{24})$$
$$p_3 = -(P_p)_{21}$$
$$p_4 = -(P_p)_{22}$$
$$p_5 = -(P_p)_{23} \frac{H}{2} f_y$$
$$p_6 = s_2((P_p)_{11} + (P_p)_{21})$$
$$p_7 = s_2((P_p)_{12} + (P_p)_{22})$$
$$p_8 = s_2((P_p)_{13} + (P_p)_{23}) \frac{H}{2} f_y$$

are precomputed from the system parameters. Depth reconstruction is obtained with $$T'_1 = p'_1$$
$$T'_2 = p'_2 \quad (34)$$

where $$p'_1 = p'_1 \sqrt{q}$$
$$p'_2 = p'_2 \sqrt{q}. \quad (35)$$

Texture Map Coefficients

Texture map coefficients are precomputed as $$\sigma_1 = x' + h_0 y' + h_1$$
$$\sigma_2 = h_2 x' + h_3 y' + h_4$$
$$\sigma_3 = h_5 x' + h_6 y' + h_7$$
$$\sigma_4 = h_8 \|d\|$$
$$\sigma_5 = h_9 \|d\|$$
$$\sigma_6 = h_{10} \|d\|, \quad (36)$$

where $$h_0 = \frac{(P_t)_{12} + (P_t)_{32}}{(P_t)_{11} + (P_t)_{31}} \quad (37)$$

$$h_1 = \frac{(P_t)_{13} + (P_t)_{33}}{(P_t)_{11} + (P_t)_{31}} \frac{H}{2} f_y$$

$$h_2 = \frac{(P_t)_{21} + (P_t)_{31}}{(P_t)_{11} + (P_t)_{31}}$$

$$h_3 = \frac{(P_t)_{22} + (P_t)_{32}}{(P_t)_{11} + (P_t)_{31}}$$

-continued $$h_4 = \frac{(P_t)_{23} + (P_t)_{33}}{(P_t)_{11} + (P_t)_{31}} \frac{H}{2} f_y$$

$$h_5 = \frac{(P_t)_{31}}{(P_t)_{11} + (P_t)_{31}} \frac{2}{s_{uv}}$$

$$h_6 = \frac{(P_t)_{32}}{(P_t)_{11} + (P_t)_{31}} \frac{2}{s_{uv}}$$

$$h_7 = \frac{(P_t)_{33}}{(P_t)_{11} + (P_t)_{31}} \frac{H}{s_{uv}} f_y$$

$$h_8 = \frac{(P_t)_{14} + (P_t)_{34}}{(P_t)_{11} + (P_t)_{31}} \frac{H}{2} s_1$$

$$h_9 = \frac{(P_t)_{24} + (P_t)_{34}}{(P_t)_{11} + (P_t)_{31}} s_1$$

$$h_{10} = 2 \frac{(P_t)_{34}}{(P_t)_{11} + (P_t)_{31}} \frac{s_1}{s_{uv}}.$$

When texture map is reconstructed from z rather than from r, $$\sigma'_4 = h'_8$$

$$\sigma'_5 = h'_9$$

$$\sigma'_6 = h'_{10} \quad (38)$$

are used with $$h'_8 = h_8 \sqrt{q}$$

$$h'_9 = h_9 \sqrt{q}$$

$$h'_{10} = h_{10} \sqrt{q} \quad (39)$$

FIG. 5 illustrates an example of coefficient precomputation. FIG. 6 illustrates an example of range and texture reconstruction and coefficient precomputation.

Figure 7:
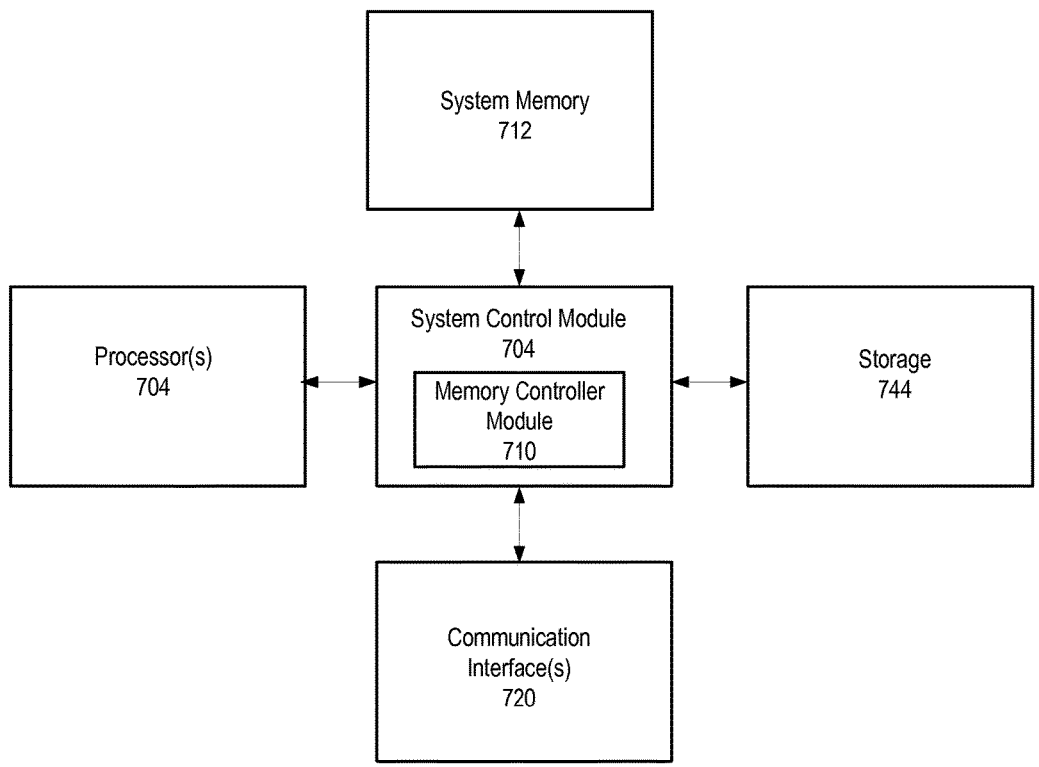
FIG. 7 is a block diagram of one embodiment of a system.

FIG. 7 illustrates, for one embodiment, an example system 700 having one or more processor(s) 704, system control module 708 coupled to at least one of the processor(s) 704, system memory 712 coupled to system control module 708, non-volatile memory (NVM)/storage 714 coupled to system control module 708, and one or more communications interface(s) 720 coupled to system control module 708. In some embodiments, the system 700 may include capture device 100 and provide logic/module that performs functions aimed at compensating for projector distortions in the depth determination in a reconstructed object image described herein.

In some embodiments, the system 700 may include one or more computer-readable media (e.g., system memory or NVM/storage 714) having instructions and one or more processors (e.g., processor(s) 704) coupled with the one or more computer-readable media and configured to execute the instructions to implement a module to perform image distortion correction calculation actions described herein.

System control module 708 for one embodiment may include any suitable interface controllers to provide for any suitable interface to at least one of the processor(s) 704 and/or to any suitable device or component in communication with system control module 708.

System control module 708 may include memory controller module 710 to provide an interface to system memory 712. The memory controller module 710 may be a hardware module, a software module, and/or a firmware module. System memory 712 may be used to load and store data and/or instructions, for example, for system 700. System memory 712 for one embodiment may include any suitable volatile memory, such as suitable DRAM, for example. System control module 708 for one embodiment may include one or more input/output (I/O) controller(s) to provide an interface to NVM/storage 714 and communications interface(s) 720.

The NVM/storage 714 may be used to store data and/or instructions, for example. NVM/storage 714 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 714 may include a storage resource physically part of a device on which the system 700 is installed or it may be accessible by, but not necessarily a part of, the device. For example, the NVM/storage 714 may be accessed over a network via the communications interface(s) 720.

Communications interface(s) 720 may provide an interface for system 700 to communicate over one or more network(s) and/or with any other suitable device. The system 700 may wirelessly communicate with the one or more components of the wireless network in accordance with any of one or more wireless network standards and/or protocols.

For one embodiment, at least one of the processor(s) 704 may be packaged together with logic for one or more controller(s) of system control module 708, e.g., memory controller module 710. For one embodiment, at least one of the processor(s) 704 may be packaged together with logic for one or more controllers of system control module 708 to form a System in Package (SiP). For one embodiment, at least one of the processor(s) 704 may be integrated on the same die with logic for one or more controller(s) of system control module 708. For one embodiment, at least one of the processor(s) 704 may be integrated on the same die with logic for one or more controller(s) of system control module 708 to form a System on Chip (SoC).

In various embodiments, the system 700 may have more or less components, and/or different architectures. For example, in some embodiments, the system 700 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 700 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 700 may be any other electronic device.

Figure 8:
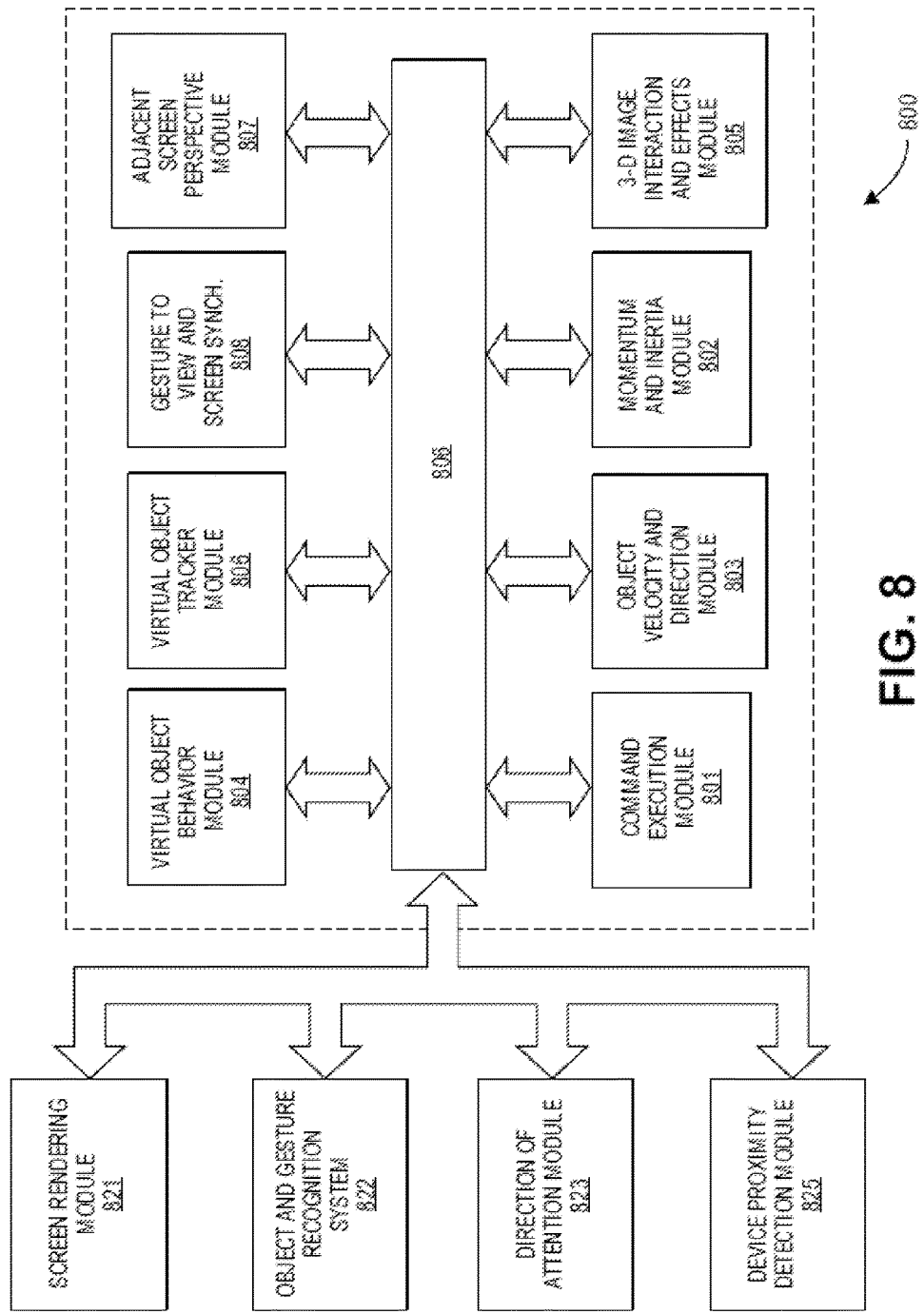
FIG. 8 illustrates an embodiment of a computing environment capable of supporting the operations described herein.

FIG. 8 illustrates an embodiment of a computing environment 800 capable of supporting the operations discussed above. The modules described before can use the depth information (e.g., values) and other data described above to perform these functions. The modules and systems can be implemented in a variety of different hardware architectures and form factors.

Command Execution Module 801 includes a central processing unit to cache and execute commands and to distribute tasks among the other modules and systems shown. It may include an instruction stack, a cache memory to store intermediate and final results, and mass memory to store applications and operating systems. Command Execution Module 801 may also serve as a central coordination and task allocation unit for the system.

Screen Rendering Module 821 draws objects on the one or more multiple screens for the user to see. It can be adapted to receive the data from Virtual Object Behavior Module 804, described below, and to render the virtual object and any other objects and forces on the appropriate screen or screens. Thus, the data from Virtual Object Behavior Module 804 would determine the position and dynamics of the virtual object and associated gestures, forces and objects, for example, and Screen Rendering Module 821 would depict the virtual object and associated objects and environment on a screen, accordingly. Screen Rendering Module 821 could further be adapted to receive data from Adjacent Screen Perspective Module 807, described below, to either depict a target landing area for the virtual object if the virtual object could be moved to the display of the device with which Adjacent Screen Perspective Module 807 is associated. Thus, for example, if the virtual object is being moved from a main screen to an auxiliary screen, Adjacent Screen Perspective Module 807 could send data to the Screen Rendering Module 821 to suggest, for example in shadow form, one or more target landing areas for the virtual object on that track to a user's hand movements or eye movements.

Object and Gesture Recognition System 822 may be adapted to recognize and track hand and harm gestures of a user. Such a module may be used to recognize hands, fingers, finger gestures, hand movements and a location of hands relative to displays. For example, Object and Gesture Recognition System 822 could for example determine that a user made a body part gesture to drop or throw a virtual object onto one or the other of the multiple screens, or that the user made a body part gesture to move the virtual object to a bezel of one or the other of the multiple screens. Object and Gesture Recognition System 822 may be coupled to a camera or camera array, a microphone or microphone array, a touch screen or touch surface, or a pointing device, or some combination of these items, to detect gestures and commands from the user.

The touch screen or touch surface of Object and Gesture Recognition System 822 may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by Object and Gesture Recognition System 822, using one or more cameras, without the benefit of a touch surface.

Direction of Attention Module 823 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to Object and Gesture Recognition Module 822 to ensure that the gestures or commands are associated with the appropriate library for the active display. Similarly, if the user is looking away from all of the screens, then commands can be ignored.

Device Proximity Detection Module 825 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to Object Gesture and Recognition System 822. For a display device, it may be considered by Adjacent Screen Perspective Module 807.

Virtual Object Behavior Module 804 is adapted to receive input from Object Velocity and Direction Module 803, and to apply such input to a virtual object being shown in the display. Thus, for example, Object and Gesture Recognition System 822 would interpret a user gesture and by mapping the captured movements of a user's hand to recognized movements, Virtual Object Tracker Module 806 would associate the virtual object's position and movements to the movements as recognized by Object and Gesture Recognition System 822, Object and Velocity and Direction Module 803 would capture the dynamics of the virtual object's movements, and Virtual Object Behavior Module 804 would receive the input from Object and Velocity and Direction Module 803 to generate data that would direct the movements of the virtual object to correspond to the input from Object and Velocity and Direction Module 803.

Virtual Object Tracker Module 806 on the other hand may be adapted to track where a virtual object should be located in three-dimensional space in a vicinity of a display, and which body part of the user is holding the virtual object, based on input from Object Gesture and Recognition System 822. Virtual Object Tracker Module 806 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

Gesture to View and Screen Synchronization Module 808, receives the selection of the view and screen or both from Direction of Attention Module 823 and, in some cases, voice commands to determine which view is the active view and which screen is the active screen. It then causes the relevant gesture library to be loaded for Object and Gesture Recognition System 822. Various views of an application on one or more screens can be associated with alternative gesture libraries or a set of gesture templates for a given view.

Adjacent Screen Perspective Module 807, which may include or be coupled to Device Proximity Detection Module 825, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. Adjacent Screen Perspective Module 807 may, in this way, determine coordinates of an adjacent screen relative to its own screen coordinates. Thus, the Adjacent Screen Perspective Module may determine which devices are in proximity to each other, and further potential targets for moving one or more virtual object's across screens. Adjacent Screen Perspective Module 807 may further allow the position of the screens to be correlated to a model of three-dimensional space representing all of the existing objects and virtual objects.

Object and Velocity and Direction Module 803 may be adapted to estimate the dynamics of a virtual object being moved, such as its trajectory, velocity (whether linear or angular), momentum (whether linear or angular), etc. by receiving input from Virtual Object Tracker Module 806. The Object and Velocity and Direction Module 803 may further be adapted to estimate dynamics of any physics forces, by for example estimating the acceleration, deflection, degree of stretching of a virtual binding, etc. and the dynamic behavior of a virtual object once released by a user's body part. Object and Velocity and Direction Module 803 may also use image motion, size and angle changes to estimate the velocity of objects, such as the velocity of hands and fingers Momentum and Inertia Module 802 can use image motion, image size, and angle changes of objects in the image plane or in a three-dimensional space to estimate the velocity and direction of objects in the space or on a display. Momentum and Inertia Module 802 is coupled to Object and Gesture Recognition System 822 to estimate the velocity of gestures performed by hands, fingers, and other body parts and then to apply those estimates to determine momentum and velocities to virtual objects that are to be affected by the gesture.

3D Image Interaction and Effects Module 805 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module 805 in the foreground on one or more of the displays.

In a first example embodiment, an apparatus comprises a projector configured to project a sequence of light patterns on an object; a first camera configured to capture a sequence of images of the object illuminated with the projected light patterns; a processing unit to receive the sequence of images and reconstruct depth using triangulation in response to camera and projector location coordinates; and a projector distortion compensation unit operable to generate a new projector location coordinate in response to an observed distorted projector location coordinate, the projector distortion compensation unit to provide the new projector location coordinate to the processing unit for use in generating depth values via triangulation.

In another example embodiment, the subject matter of the first example embodiment can optionally include that the projector distortion compensation unit generates the new projector location coordinate using successive linearization of the distorted projector surface.

In another example embodiment, the subject matter of the first example embodiment can optionally include that the processing unit is operable to generate a depth value based on the new projector location coordinate and a camera location coordinate.

In another example embodiment, the subject matter of the first example embodiment can optionally include that the processing unit and the projector distortion compensation unit operate to: compute a first undistorted projector coordinate using a coordinate of a first observed distorted projector location; perform reconstruction to generate a first reconstructed point based on a camera location coordinate and the first undistorted projector coordinate; reproject the first reconstructed point to obtain a second point identified by a pair of coordinates; estimate a new distorted projector location coordinate based on one coordinate of the pair and a coordinate of the observed distorted projector location; and perform reconstruction based on a coordinate of the camera location and the new distorted projector location coordinate to produce a second reconstructed point.

In another example embodiment, the subject matter of the first example embodiment can optionally include computing the first undistorted projector coordinate is performed by applying a distortion model to the first observed distorted coordinate.

In another example embodiment, the subject matter of the first example embodiment can optionally include applying the distortion model to the first observed distorted coordinate comprises applying the distortion model to the first observed distorted coordinate and a second coordinate, the second coordinate being set to a center of an axis of projection perpendicular to a code direction.

In another example embodiment, the subject matter of the first example embodiment can optionally include that reprojecting, estimating and performing reconstruction are performed iteratively. In another example embodiment, the subject matter of the last example embodiment can optionally include that reprojecting, estimating and performing reconstruction are performed for two iterations.

In another example embodiment, the subject matter of the first example embodiment can optionally include that the first camera comprises a digital IR camera.

In another example embodiment, the subject matter of the first example embodiment can optionally include that the projector is configured to project one-dimensional coded light patterns on the object.

In another example embodiment, the subject matter of the first example embodiment can optionally include a second camera, and wherein the projector comprises an infrared (IR) projector, the first camera comprises an IR camera, and the second camera comprises a red, green, and blue (RGB) camera.

In a second example embodiment, an apparatus comprises projecting, using a projector, a sequence of light patterns on an object; capturing, using a first camera, a sequence of images of the object illuminated with the projected light patterns; and determining depth information using triangulation in response to camera and projector location coordinates, including generating a new projector location coordinate in response to an observed distorted projector location coordinate, the new projector location coordinate being used in generating depth values via triangulation.

In another example embodiment, the subject matter of the second example embodiment can optionally include generating the new projector location coordinate using successive linearization of the distorted projector surface.

In another example embodiment, the subject matter of the second example embodiment can optionally include generating a depth value is based on the new projector location coordinate and a camera location coordinate.

In another example embodiment, the subject matter of the second example embodiment can optionally include that determining depth information comprises: computing a first undistorted projector coordinate using a coordinate of a first observed distorted projector location; performing reconstruction to generate a first reconstructed point based on an undistorted camera location coordinate and the first undistorted projector coordinate; reprojecting the first reconstructed point to obtain a second point identified by a pair of coordinates; estimating a new distorted projector location coordinate based on one coordinate of the pair and a coordinate of the observed distorted projector location; and performing reconstruction based on a coordinate of the undistorted camera location and the new distorted projector location coordinate to produce a second reconstructed point.

In another example embodiment, the subject matter of the second example embodiment can optionally include computing the first undistorted projector coordinate is performed by applying a distortion model to the first observed distorted coordinate.

In another example embodiment, the subject matter of the second example embodiment can optionally include applying the distortion model to the first observed distorted coordinate comprises applying the distortion model to the first observed distorted coordinate and a second coordinate, the second coordinate being set to a center of an axis of projection perpendicular to a code direction.

In another example embodiment, the subject matter of the second example embodiment can optionally include that reprojecting, estimating and performing are performed iteratively. In another example embodiment, the subject matter of the last example embodiment can optionally include that reprojecting, estimating and performing are performed for two iterations.

In a second example embodiment, an article of manufacture has one or more non-transitory computer readable storage media storing instructions which when executed by a system to perform a method comprising: projecting, using a projector, a sequence of light patterns on an object; capturing, using a first camera, a sequence of images of the object illuminated with the projected light patterns; and determining depth information using triangulation in response to camera and projector location coordinates, including generating a new projector location coordinate in response to an observed distorted projector location coordinate, the new projector location coordinate being used in generating depth values via triangulation.

In another example embodiment, the subject matter of the third example embodiment can optionally include that generating the new projector location coordinate using successive linearization of the distorted projector surface.

In another example embodiment, the subject matter of the third example embodiment can optionally include that generating a depth value is based on the new projector location coordinate and an undistorted camera location coordinate.

In another example embodiment, the subject matter of the third example embodiment can optionally include that determining depth information comprises: computing a first undistorted projector coordinate using a coordinate of a first observed distorted projector location; performing reconstruction to generate a first reconstructed point based on an undistorted camera location coordinate and the first undistorted projector coordinate; reprojecting the first reconstructed point to obtain a second point identified by a pair of coordinates; estimating a new distorted projector location coordinate based on one coordinate of the pair and a coordinate of the observed distorted projector location; and performing reconstruction based on a coordinate of the undistorted camera location and the new distorted projector location coordinate to produce a second reconstructed point.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
   a projector configured to project a sequence of light patterns on an object;
   a first camera configured to capture a sequence of images of the object illuminated with the projected light patterns;
   a projector distortion compensation unit operable to generate a new projector location coordinate in response to an observed distorted projector location coordinate, the projector distortion compensation unit to output the new projector location coordinate; and
   a processing unit to receive the sequence of images and the new projector location coordinate and to reconstruct depth using triangulation in response to a camera location coordinate and the new projector location coordinate, wherein the processing unit is operable to generate a depth value based on the new projector location coordinate and the camera location coordinate.

2. The apparatus defined in claim 1 wherein the projector distortion compensation unit generates the new projector location coordinate using successive linearization of the distorted projector surface.

3. The apparatus defined in claim 1 wherein the processing unit and the projector distortion compensation unit operate to:
   compute a first undistorted projector coordinate using a coordinate of a first observed distorted projector location;
   perform reconstruction to generate a first reconstructed point based on the camera location coordinate and the first undistorted projector coordinate;
   reproject the first reconstructed point to obtain a second point identified by a pair of coordinates;
   estimate a new distorted projector location coordinate based on one coordinate of the pair and a coordinate of the observed distorted projector location; and
   perform reconstruction based on a coordinate of the camera location and the new distorted projector location coordinate to produce a second reconstructed point.

4. The apparatus defined in claim 3 wherein computing the first undistorted projector coordinate is performed by applying a distortion model to the first observed distorted coordinate.

5. The apparatus defined in claim 4 wherein applying the distortion model to the first observed distorted coordinate comprises applying the distortion model to the first observed distorted coordinate and a second coordinate, the second coordinate being set to a center of an axis of projection that is perpendicular to the code direction.

6. The apparatus defined in claim 3 wherein reprojecting, estimating and performing reconstruction are performed iteratively.

7. The apparatus defined in claim 6 wherein reprojecting, estimating and performing reconstruction are performed for two iterations.

8. The apparatus defined in claim 1 wherein the first camera comprises a digital infrared (IR) camera.

9. The apparatus defined in claim 1 wherein the projector is configured to project one-dimensional coded light patterns on the object.

10. The apparatus defined in claim 1 further comprising a second camera, and wherein the projector comprises an infrared (IR) projector, the first camera comprises an IR camera, and the second camera comprises a red, green, and blue (RGB) camera.

11. A method for performing projector distortion correction in a system that generates depth values via triangulation, the method comprising:
    projecting, using a projector, a sequence of light patterns on an object;
    capturing, using a first camera, a sequence of images of the object illuminated with the projected light patterns;
    generating a new projector location coordinate in response to an observed distorted projector location coordinate; and
    determining depth information using triangulation in response to a camera location coordinate and the new projector location coordinate, the new projector location coordinate being used in generating depth values via triangulation, wherein determining depth information comprises generating a depth value based on the new projector location coordinate and the camera location coordinate.

12. The method defined in claim 11 wherein generating the new projector location coordinate using successive linearization of the distorted projector surface.

13. The method defined in claim 12 wherein determining depth information comprises:
    computing a first undistorted projector coordinate using a coordinate of a first observed distorted projector location;
    performing reconstruction to generate a first reconstructed point based on an undistorted camera location coordinate and the first undistorted projector coordinate;
    reprojecting the first reconstructed point to obtain a second point identified by a pair of coordinates;
    estimating a new distorted projector location coordinate based on one coordinate of the pair and a coordinate of the observed distorted projector location; and
    performing reconstruction based on a coordinate of the undistorted camera location and the new distorted projector location coordinate to produce a second reconstructed point.

14. The method defined in claim 13 wherein computing the first undistorted projector coordinate is performed by applying a distortion model to the first observed distorted coordinate.

15. The method defined in claim 14 wherein applying the distortion model to the first observed distorted coordinate comprises applying the distortion model to the first observed distorted coordinate and a second coordinate, the second coordinate being set to a center of an axis of projection that is perpendicular to the code direction.

16. The method defined in claim 13 wherein reprojecting, estimating and performing are performed iteratively.

17. The method defined in claim 16 wherein reprojecting, estimating and performing are performed for two iterations.

18. An article of manufacture having one or more non-transitory computer readable storage media storing instructions which when executed by a system to perform a method comprising:

projecting, using a projector, a sequence of light patterns on an object;

capturing, using a first camera, a sequence of images of the object illuminated with the projected light patterns;

generating a new projector location coordinate in response to an observed distorted projector location coordinate; and determining depth information using triangulation in response to a camera location coordinate and the new projector location coordinate, the new projector location coordinate being used in generating depth values via triangulation, wherein generating a depth value is based on the new projector location coordinate and an undistorted camera location coordinate.

19. The article of manufacture defined in claim 18 wherein generating the new projector location coordinate using successive linearization of the distorted projector surface.

20. The article of manufacture defined in claim 18 wherein determining depth information comprises:

computing a first undistorted projector coordinate using a coordinate of a first observed distorted projector location;

performing reconstruction to generate a first reconstructed point based on the undistorted camera location coordinate and the first undistorted projector coordinate;

reprojecting the first reconstructed point to obtain a second point identified by a pair of coordinates;

estimating a new distorted projector location coordinate based on one coordinate of the pair and a coordinate of the observed distorted projector location; and performing reconstruction based on a coordinate of the undistorted camera location and the new distorted projector location coordinate to produce a second reconstructed point.

* * * * *